No. 641,576. Patented Jan. 16, 1900.
G. W. BUCKALEW.
INTERCEPTING VALVE FOR AIR BRAKES.
(Application filed Sept. 11, 1899.)
(No Model.) 2 Sheets—Sheet 1.
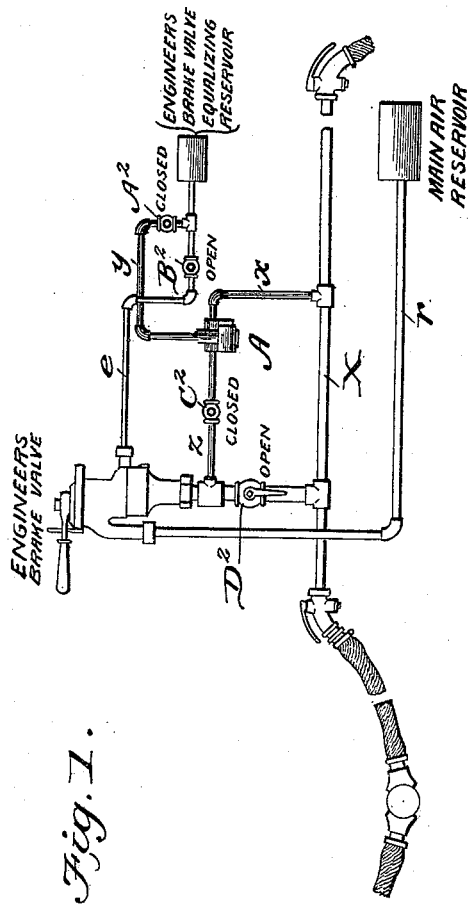
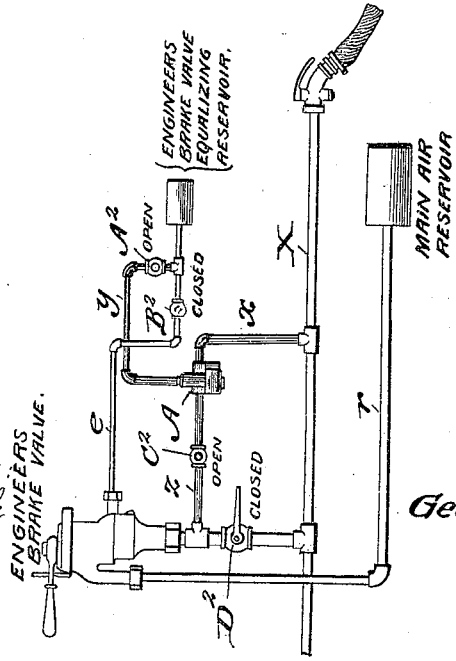
WITNESSES:
INVENTOR
George W. Buckalew.
BY
ATTORNEYS No. 641,576. Patented Jan. 16, 1900.
G. W. BUCKALEW.
INTERCEPTING VALVE FOR AIR BRAKES.
(Application filed Sept. 11, 1899.)
(No Model.) 2 Sheets—Sheet 2.
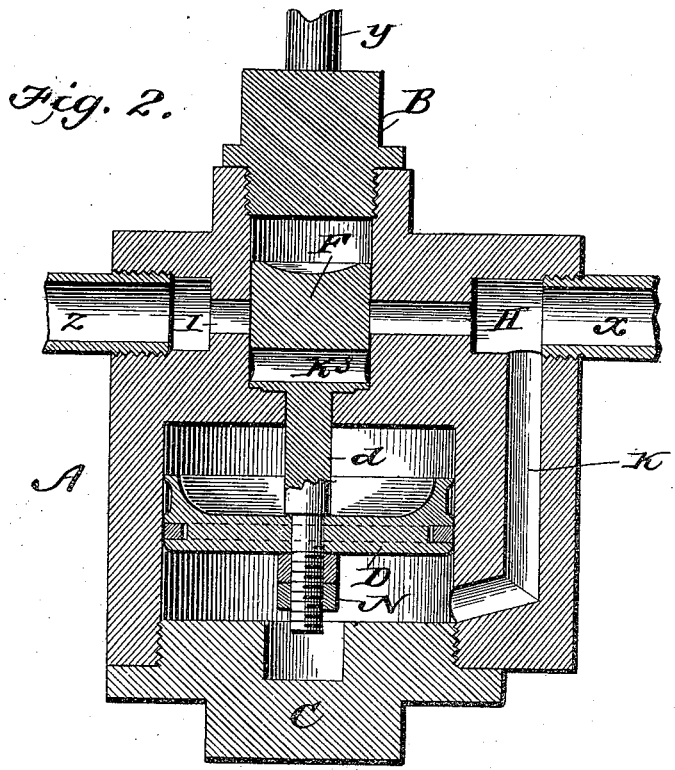
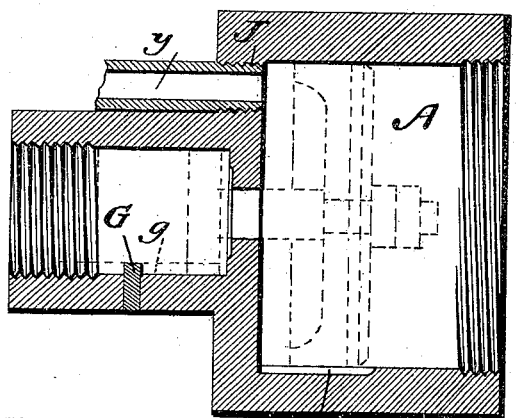
WITNESSES:
INVENTOR
George W. Buckalew.
BY
ATTORNEYS

UNITED STATES PATENT OFFICE.

GEORGE W. BUCKALEW, OF MEMPHIS, TENNESSEE, ASSIGNOR OF ONE-HALF TO JACKSON H. BUCKALEW, OF SAME PLACE.

INTERCEPTING-VALVE FOR AIR-BRAKES.

SPECIFICATION forming part of Letters Patent No. 641,576, dated January 16, 1900.

Application filed September 11, 1899. Serial No. 730,160. (No model.)

*To all whom it may concern:*

Be it known that I, GEORGE W. BUCKALEW, of Memphis, in the county of Shelby and State of Tennessee, have invented a new and useful Improvement in Intercepting-Valves for Air-Brakes, of which the following is a specification.

The object of my invention is to provide such an arrangement of valves and pipes in connection with a system of air-brakes as will enable one or more engines coupled to the rear end of the tender of the leading engine or at the rear end of the train as helping-engines, where it can be connected to the train-pipe, to coöperate with the leading engine at the head of the train in supplying air from its main reservoir to the train-pipe, so as to assist in supplying the brakes in long trains. When my devices are applied, they are so adjusted on the leading engine as to be thrown out of action, so that the leading engine acts in the usual way to apply the brakes for the whole train by a reduction of pressure in the train-pipe through the engineer's valve of the front engine; but with the rear engine my devices by proper adjustment are brought into action for automatically supplying to the train-pipe air from its main reservoir and still permitting pressure to be reduced in applying the brakes from the front engine.

My invention consists in the construction and arrangement of a valve, which I term an "intercepting-valve," whereby the above results are accomplished in a simple and practical way with but slight alteration in the connections, as will be hereinafter more fully described with reference to the drawings, in which—

Figure 1 is a view of the devices on the front and rear engines embodying my improvements and shown in relation to the train-pipe extending throughout the train from engine to engine. Fig. 2 is an enlarged vertical section of the intercepting-valve. Fig. 3 is a section of its case, taken at right angles to the plane of the section in Fig. 2; and Fig. 4 are details of the valve proper and its stem.

Referring to Fig. 1, the devices shown on the right represent the leading engine, the one on the left the following engine, and X is the train-pipe, connected by hose and couplings throughout the train and which in my invention is capable of being put in communication with the main reservoir of both engines. As both engines are equipped exactly alike, it will be sufficient to describe one of them. They have the following old features of the Westinghouse system, which are shown in outline only—viz., the main air-reservoir communicating through pipe $r$ with the engineer's brake-valve, the cock $D^2$, by which the engineer's valve is cut off from the train-pipe X, and also the engineer's equalizing-reservoir, connected through pipe $e$ with the engineer's brake-valve. The parts which I have invented and applied to these old devices are shown in shaded lines and consist of an intercepting-valve A and pipes $x$ $y$ $z$. The pipe $x$ connects the train-pipe with one side of valve A. The pipe $z$ connects the other side of said valve with the engineer's brake-valve at a point above its cock $D^2$, the pipe $z$ having a shut-off cock $C^2$ interposed in its length. The pipe $y$ establishes communication between the opening J on the top of valve A and the engineer's equalizing-reservoir, the pipes $y$ and $e$ having, respectively, cocks $A^2$ and $B^2$ to permit them to be alternately connected and disconnected, as desired.

Before explaining its operation it will be necessary to understand the construction of the intercepting-valve A, as seen in Figs. 2, 3, and 4. This valve has a casing A, bored to receive a piston D, which by means of a shoulder and nut N is connected to a valve-stem $d$, formed with the valve-head F. This valve-head is cylindrical and plays in a cylindrically-bored recess in the case, which is closed by a screw-plug B. The lower end of the piston-cylinder is closed by a larger screw-plug C.

The valve-head F has a transverse port $K^3$ through it, which is arranged to be lifted into registration with the two ports I and H, formed in the casing on opposite sides of the valve and communicating, respectively, with the pipes $z$ and $x$.

In the side of the casing A there is a branch port K, which at the upper end communicates with the port H and at its lower end with the lower end of the piston-cylinder. In the inner side of the piston-cylinder there is cut a feed-groove M, (see Fig. 3,) which when the piston passes to its upper position allows air to leak or feed past this piston. The valve-head F is guided true and prevented from rotating, so as to preserve the alinement of its port $K^3$ with I and H by means of a groove $g$, Fig. 4, in its side, which receives a dowel G, Fig. 3, as the valve rises and falls.

Referring now to Fig. 1, the operation of my devices is as follows: In the leading engine, on the right-hand side, cocks $A^2$ and $C^2$ are closed and intercepting-valve A is dead or useless, while cocks $B^2$ and $D^2$ are open to establish the necessary communication between the engineer's valve, equalizing-reservoir, and train-pipe in the usual way, it being understood that the front engine applies and releases the brakes, but has no use whatever for my valve A and pipes $x$ $y$ $z$. In the other engine at the end of the train these latter parts are brought into requisition; but the engineer's brake-valve is not to be operated for applying brakes and must remain at all times in running position. Hence cocks $B^2$ and $D^2$ are closed and $A^2$ and $C^2$ are opened. Now when the front engine applies the brakes by reducing the pressure in the train-pipe in the usual way the reduction of pressure, acting through pipe $x$, reduces pressure under piston D (see Fig. 2) and allows the pressure through pipe $y$, Fig. 3, from the engineer's equalizing-reservoir to force down the piston to the position shown in Fig. 2. This throws port $K^3$ out of registration with ports I and H and cuts off communication (see Fig. 1) between pipe $x$ and X on the one side and pipes $z$ $r$ and engineer's valve on the other side, so that compressed air from the main reservoir of the rear engine does not flow into the train-pipe, and hence the front engine can control the reduction of pressure and the application of brakes. When the brakes are released and the pressure is thrown on the train-pipes again, this pressure, acting through pipe $x$ and on the under side of piston D, forces the latter up again, establishing communication between pipes $x$ and $z$ and putting main reservoir into communication with train-pipe X to supply it with air at the rear end of the train. As the piston rises to the position shown in Fig. 3 the air feeds up through groove M past the piston and through pipe $y$ to the engineer's equalizing-reservoir to restore its reduced pressure to normal again.

In practice I prefer to connect pipe $y$ to the engineer's equalizing-reservoir; but a separate reservoir might be employed, if desired.

Having thus described my invention, what I claim as new, and desire to secure by Letters Patent, is—

1. In an air-brake system, the combination with the train-pipe and engineer's brake-valve; of an intercepting-valve placed at a point between the train-pipe and engineer's brake-valve and above the cock of the latter which cuts off the train-pipe therefrom, said intercepting-valve having a piston and attached valve-head which latter controls the flow from the main reservoir and engineer's valve to the train-pipe, and the piston having its working face exposed to the influence of the varying pressure in the train-pipe substantially as described.

2. In an air-brake system, the combination with the train-pipe, and engineer's brake-valve; of an intercepting-valve placed at a point between the train-pipe and the engineer's brake-valve and above the cock of the latter which cuts off the train-pipe therefrom, said intercepting-valve having a piston and attached valve-head, which latter controls the flow from the main reservoir and engineer's valve to the train-pipe, and which piston has its working face exposed to the varying pressure of the train-pipe, and an air-reservoir having a pipe leading to the opposite side of the piston from its working face substantially as and for the purpose described.

3. In an air-brake system as described, the combination with a pipe leading to the engineer's valve and having a stop-cock, a pipe leading to the engineer's brake-valve-equalizing reservoir also having a stop-cock, and a pipe leading to the main train-pipe; of an intercepting-valve interposed between these pipes, said valve comprising a case bored to form cylinders of different diameters at its opposite ends and having screw-plugs fitting in the outer ends of said cylinders, a transverse passage-way leading through the smaller of said cylinders, and a longitudinal passage-way establishing communication between this transverse passage-way and the more remote end of the larger cylinder, and having also a longitudinal groove M on the inner face of the larger cylinder, and a piston and valve-head connected to the same stem, the piston being in the larger cylinder, and the valve-head in the smaller cylinder and having a transverse port through it adapted to register with or be cut off from the said transverse passage-way substantially as and for the purpose described.

4. The intercepting-valve comprising a case bored to form cylinders of different diameters at its opposite ends, and having screw-plugs fitting in the outer ends of said cylinders, a transverse passage-way leading through the smaller of said cylinders, and a longitudinal passage-way establishing communication between the transverse passage-way and the more remote end of the larger cylinder, and having also a longitudinal groove M on the inner face of the larger cylinder, a piston and valve-head connected to the same stem, the piston being in the larger cylinder, and the valve-head in the smaller one and having a transverse port through it adapted to register with or be cut off from the said transverse passage-way; said intercepting-valve being placed in and combined with an air-brake system, and having its transverse passage-way on one side connected to the engineer's brake-valve above the cock leading to the train-pipe, and on the other side connected directly to the train-pipe, and the upper part of the larger cylinder of the intercepting-valve being connected to an air-reservoir as described.

GEORGE W. BUCKALEW.

Witnesses:
T. P. POSTON,
THOS. B. CRENSHAW.